United States Patent [19]

Brain et al.

[11] 4,426,940
[45] Jan. 24, 1984

[54] IMPLEMENTS FOR INJECTING SUBSTANCES BELOW THE SURFACE OF THE SOIL

[75] Inventors: David M. Brain, Sampford Peverell; Gerald M. Frankpitt, Tiverton, both of England

[73] Assignee: Twose of Tiverton Limited, Tiverton, England

[21] Appl. No.: 338,293

[22] Filed: Jan. 11, 1982

[30] Foreign Application Priority Data

Jan. 12, 1981 [GB] United Kingdom ............... 8100746

[51] Int. Cl.³ .................................................. A01C 23/02
[52] U.S. Cl. .................................... 111/7; 111/52;
111/85; 111/86; 172/619; 172/633; 172/657;
172/180
[58] Field of Search ............. 111/6, 7, 52, 53, 54,
111/55, 56, 57, 59, 1, 82, 83, 85, 86; 405/128;
172/151, 180, 184, 196, 629, 633, 619, 657, 40

[56] References Cited

U.S. PATENT DOCUMENTS

| Re. 25,307 | 4/1954 | Johnston | 111/6 |
|---|---|---|---|
| 3,231,025 | 1/1966 | Bodine | 111/7 |
| 3,793,967 | 2/1974 | van der Berg | 111/7 |
| 3,799,079 | 3/1974 | Dietrich | 111/7 |
| 3,842,764 | 10/1974 | Baur | 111/7 |
| 3,863,721 | 2/1975 | Scerbo et al. | 172/40 |
| 3,865,056 | 2/1975 | Danford | 111/7 |
| 4,014,271 | 3/1977 | Rohlf et al. | 111/7 |
| 4,056,226 | 11/1977 | Hodgson | 111/7 |
| 4,079,593 | 3/1978 | Flippin | 172/40 |
| 4,232,616 | 11/1980 | van der Lely | 111/7 |

FOREIGN PATENT DOCUMENTS

| 1460737 | 1/1977 | United Kingdom | 111/7 |
|---|---|---|---|
| 745414 | 7/1980 | U.S.S.R. | 111/7 |

Primary Examiner—Robert A. Hafer
Assistant Examiner—D. D. DeMille
Attorney, Agent, or Firm—Posnack, Roberts, Cohen & Spiecens

[57] ABSTRACT

A machine for burying slurry, sewage, or other soil-improving fluids has a hollow straight forward-leaning tine which carries at its bottom end an arched, forward-sloping delta-shaped shoe for lifting the soil into the form of a tunnel. The hollow interior of the tine opens through the roof of this shoe, and slurry is delivered through the tine into the cavity under the shoe. A free-running vibrator on the tine vibrates it and the shoe vertically. The tine is resiliently loaded by a spring to its working position, and the reaction of the spring is applied directly to a reaction lever separately pivoted on a subframe carrying the tine. The spring reaction biases the lever downwards, and the lever is supported at its rearward end behind the tine by a roller which closes the slit formed by the tapered leading edge of the tine.

7 Claims, 4 Drawing Figures

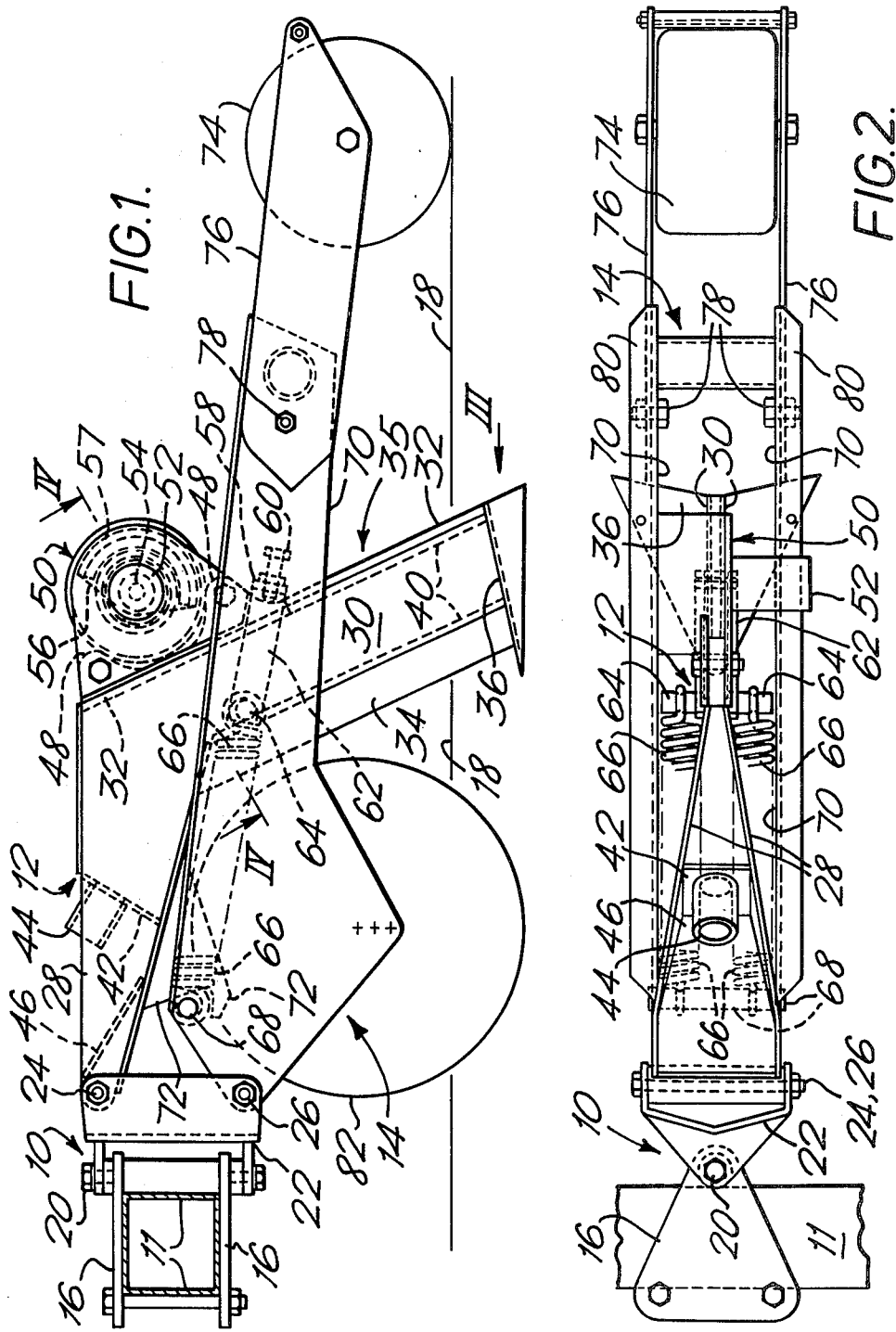

IMPLEMENTS FOR INJECTING SUBSTANCES BELOW THE SURFACE OF THE SOIL

FIELD OF THE INVENTION

This invention relates to power driven implements for injecting substances below the surface of the soil by opening up the soil at depths of up to, say, a foot (30 cms.)—or more if soil conditions dictate—below the surface. It is primarily concerned with machines for burying soil-improving or fertilizing fluids including flowable powders and pulverulent materials and wastes such as slurry and sewage (all such fluids being hereinafter referred to for convenience as "slurry") by a continuous subsurface injection process.

BACKGROUND

Such machines are known which consist of self-propelled mobile tanker wagons for the bulk transport of slurry, each wagon having a plurality of tines mounted on a subframe across the back end, and each tine having a slurry injection pipe fixed to its back wall or edge and terminating in a discharge orifice located at a height sufficiently above the level of the working tip of the tine to minimize the risk of clogging by loosened soil. Further anti-clog protection is usually afforded by chamfering or deflecting the discharge orifice so that it faces to the rear in relation to the normal forward travel of the machine.

When slurry is to be disposed below surface level, it is desirable to achieve two objectives. The first is total enclosure of the body of fluid injected, and the second is that it be disposed in as wide and shallow a zone as possible. Total enclosure is primarily an environmental objective, especially where the fluid being buried has a noxious odor or represents a health risk if left exposed on the surface. There is also an economic factor in that absorption by the soil is more efficient if the substance is totally enveloped. Following from this, absorption is more effective if the absorbing zone is wide and shallow so that the maximum surface area is exposed to the action of soil micro-organisms which break down the buried substance, and distribution to plant roots of the fertilizing constituent is more widespread, thus avoiding "banding" of the site by alternate strips of lush and lean vegetation.

Furthermore, any slurry left exposed on the surface is liable to be carried away by surface run-off in wet weather and thus to be a source of pollution of streams and rivers while at the same time representing a loss of valuable nutrients to the burial site. Alternatively, if not washed away by rain, constituents may be lost by ultraviolet degradation or evaporation while the texture of the soil at the surface becomes caked and impenetrable to oxygen.

From this it is apparent that the use of normal cultivating tools is to be avoided, since they are primarily designed to break up soil or even to turn it over by bringing subsoil to the surface. Since many of the best sites for the burial of slurry are natural grasslands whose economic value is as grazing, the need for minimum disturbance of the surface is paramount.

It is known to vibrate conventional cultivating tools to assist in the break-up of the soil. In some cases, this has been achieved by the use of fixed-amplitude vibrators such as crank and link type mechanisms. These are insensitive to the type and consistency of soil being worked and their sole objective is more rapid break-up of the soil. For this reason they are quite unsuitable for the purpose of the present invention. In other cases, free-running vibrators have been proposed which do not dictate the magnitude of the vibratory displacement of the tool. Frequently, however, the vibration imparted has been polar in character, involving a component of angular excitation of the tool. This also is not desirable for the formation of a wide but shallow tunnel below the surface of the soil which is best achieved by purely vertical excitation of the tool.

It has been proposed to achieve purely vertical vibration in a cable-burying machine using a narrow split plough. The plough is in the form of a pair of complementary narrow vertical plates having narrow pointed shoes which together form a tunnel of suitable size to receive a cable. The plates are suspended from a vibrator mechanism so as to move vertically in phase opposition and produce a shearing action on the soil which aids penetration. The plates embrace a guide for feeding the cable into the tunnel. This machine produces exactly the opposite of the objective of the present invention, viz: a wide shallow tunnel.

It has also been proposed to drain grassland by cutting a plurality of grooves thereacross which are immediately filled with sand or like water-pervious material. The tool for this purpose is a narrow blade which has secured to its rear edge a chute for the deposition in the groove cut by the blade of the sand or like drainage material. The blade and attached chute are vibrated in a fore-and-aft mode by a fixed-amplitude crank and link mechanism.

SUMMARY OF THE INVENTION

It is an object of the present invention to provide a method and means for the subsurface injection of slurry into the soil which obviates the disadvantages of the known techniques, especially when applied to grassland.

According to the present invention, means for injecting slurry beneath the surface of the soil includes a vertically displaceable tine whose working shank portion is substantially straight and meets the surface of the soil, when working, at an acute angle. It is spring-loaded against rearward deflection from its working attitude, and this working shank portion has an internal duct for slurry throughout its buried length. The bottom end of the tine is shod with an upwardly convex hollow shoe or share which is substantially triangular in both plan and side elevation, both triangles having a common leading apex so that when working, the shoe acts to lift the soil into a relatively shallow, wide tunnel. The shoe thus constitutes a rigid canopy or hood into which slurry is discharged from the duct through the tine and enters the tunnel under the initial protection of the canopy which also shields the outlet of the duct from loose soil which might otherwise clog it. The tine supports, at a level above the surface of the soil, a free-running vibrator which imparts vertical vibrations to the tine and shoe assembly, at least while the slurry is being injected, in the longitudinal plane containing the tine and its direction of travel through the soil, and the reaction abutment for the loading spring is on a reaction lever which transfers the reactive force of both the spring tension and the vibration directly to the surface of the soil.

Preferably, the tine is pivotally mounted, in generally conventional manner, on a rigid suport or subframe on which the reaction lever is also pivoted for deflection in the same vertical plane as the tine, the spring abutment or anchorage being located at a position relative to the lever pivot such that the force exerted by the spring on its abutment during operation of the tine produces a moment tending to depress the lever about its pivot. This moment is balanced by the opposite moment exerted by the ground on the free end of the lever, preferably through a roller engaging the soil surface behind and in alignment with the tine.

Conveniently, the lever also carries a disc coulter or like soil cutter ahead of and in alignment with the tine.

Advantageously, the pivot axis of the tine and the lever are spaced apart on the subframe, and the pivots themselves are cushion mounted.

The invention also includes the method of slurry disposal by injection thereof beneath the surface of the soil comprising forming a wide shallow tunnel below the surface of the soil and feeding the slurry thereinto, including the steps of forming a substantially straight tine with a through duct; drawing the tine in a forward-leaning attitude through the soil so that its leading edge meets the soil at an acute angle; feeding the slurry down through the duct into the tunnel; shielding the duct outlet from soil displaced by formation of the tunnel; vibrating the tine in the vertical plane, at least during injection of the slurry, and limiting the maximum depth of penetration of the soil by the tine.

Ideally, the tine is spring-loaded for resilient resistance to rearward deflection during operation, and the reaction from the spring is transferred as a downward force on a roller which is trailed at a fixed distance behind and in alignment with the tine so as to press the soil down in the wake of the tine.

BRIEF DESCRIPTION OF THE DRAWINGS

One illustrative embodiment of the invention will now be described, purely by way of example, with reference to the accompanying drawings in which:

FIG. 1 is a side elevation of a tine and associated components assembled for towing behind a slurry tanker wagon;

FIG. 2 is a plan view of FIG. 1;

DESCRIPTION OF THE ILLUSTRATED EMBODIMENT

Figure 3:
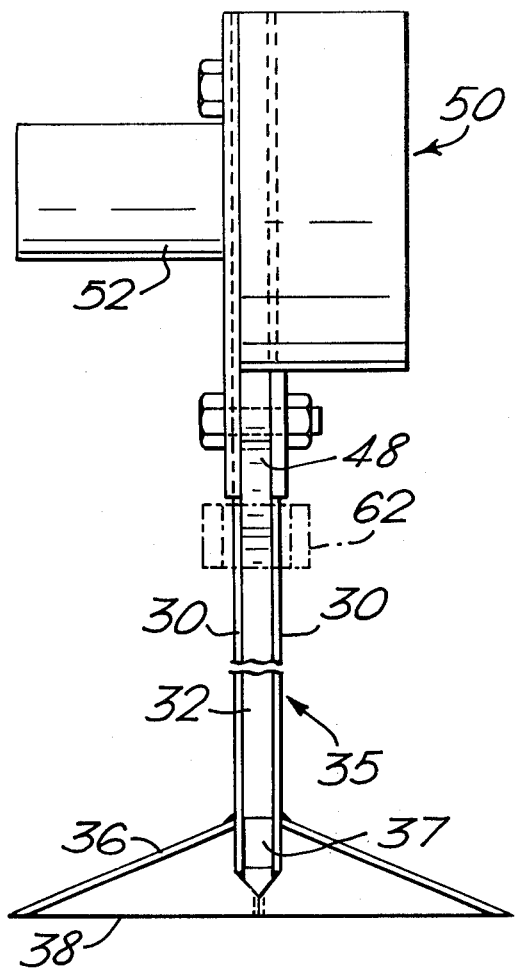
FIG. 3 is a fragmentary end elevation on the arrow III of FIG. 1.

The drawings illustrate one of what would normally be an array of several similar units mounted side by side on a tanker wagon.

The unit illustrated consists of a subframe component 10, a tine component 12 and a spring reaction component 14. The subframe component 10 comprises a heavy duty horizontal tubular bar 11 which carries adjustable clamps 16 for individual tool assemblies. Throughout this specification, the terms "horizontal" and "vertical" are to be understood in the context of a flat level surface 18 on which the vehicle (not shown) which carries the array is standing. A vertical pivot bolt 20 carried by each tool clamp supports a vertical U-shaped bracket 22 whose flanges point rearwards. This bracket carries upper and lower cushion-mounted pivot pins 24, 26 respectively, the cushion mounting preferably being constituted by a proprietary bonded rubber unit. The pivotal mounting of the bracket 22 enables the tine and reaction components 12, 14 to follow the path of the tanker wagon when turning at the end of a pass across the site without requiring lifting of the components and also avoiding the problem of leaving sufficient clearance for the overhanging units.

The tine component 12 is pivotally mounted on the bracket 22 by the upper pivot 24, and consists of a pair of upright plates each shaped like an obtuse-angled bell-crank. The upper arms 28 of the bell-cranks are anchored by the pivot 24 and lie generally horizontal. The outer arms 30 trail downwards to meet the surface 18 of the soil at an acute angle and are rigidly connected at their back edges by a fillet 32 and at their front edges by a tapered or double-chamfered fillet 34. The assembly of arms 30 and fillets 32, 34 form a narrow open-ended box having a relatively sharp leading edge and constituting a working shank of the tine 35 which, in its operative position shown in FIG. 1, leans forward to meet the soil surface 18 at an acute angle of about 65°. The tine 35 terminates at the bottom end in a longer and much wider forward-pointing upwardly convex or arched shoe or share 36 of generally triangular shape both in plan (resembling an aerodynamic delta wing) and in side elevation, the common apex of both triangles leading. The bottom edge 38 of the shoe is generally horizontal in its working attitude. The shoe 36 increases progressively in height and width from a point ahead of the chamfered leading edge 34 to a maximum at or behind the trailing edge 32 of the tine 35, and defines a wide, shallow hood or canopy the space beneath which is in open communication through a port 37 in its roof (FIG. 3) with the slurry delivery duct 40 down the tine 35. As illustrated, this duct 40 is formed by the space between the walls of the hollow shank whose designed maximum length of soil penetration is significantly less than the length of the arms 30 as measured along the leading edge 34, so that the upper end of the duct 40 always remains above the level of the soil 18.

The upper end of the duct 40 is continuous with a closed space between the rear ends of the horizontal arms 28 which diverge forwardly (FIG. 2). At approximately midway along their length, a blanking plate 42 defines the forward limit of the hollow space between the arms 28 which forms the upper section of the duct 40. Into the plate 42 is welded a nipple 44 on which a flexible hose (not shown) can be clamped. The nipple 44 opens through a blanking plate 42 to communicate with the duct 40, and forward of the plate 42 the horizontal arms 28 are braced by a plate 46 to stiffen them against lateral distortion.

Figure 4:
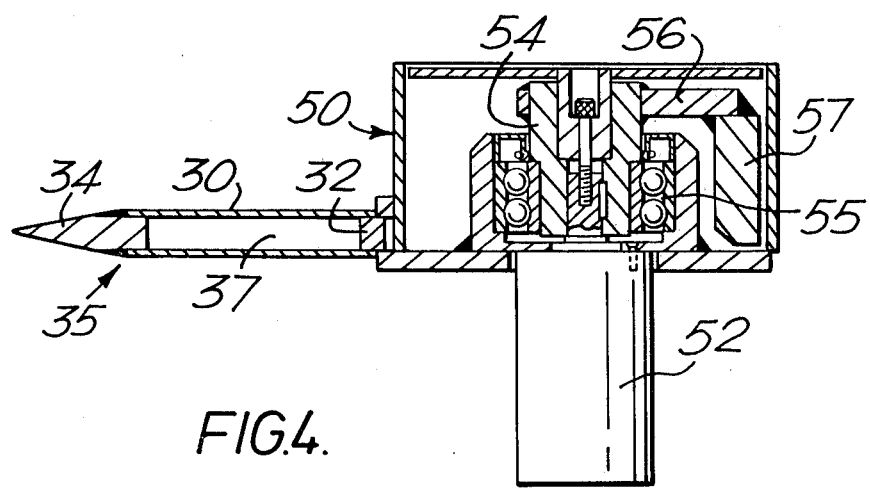
FIG. 4 is a section on the line IV—IV of FIG. 1.

The rear fillet 32 of the hollow tine 35 is formed at its top end with two rearward lugs 48 which form an overhung mounting for a rotary eccentric weight vibrator 50 (FIG. 4). This comprises a rotary motor 52, which may be hydraulic, having a transverse horizontal shaft 54 on which is fixed a weighted sector plate 56. This sector plate is positioned so that the mass center of the assembly lies in the longitudinal vertical plane containing the axis of the forward-leaning tine 35 and the direction of travel of the tine component 12. The axis of the shaft 54 also lies directly above the shoe 36 on the bottom of the tine 35, and the eccentric weight 57 itself overhangs the bearing 55 of the shaft 54. The vibrator mounting lugs 48 transmit the vertical vibrations of the weighted sector plate 56 directly to the tine 35 and the shoe 36 while they are penetrating the soil. When burying slurry in grassland, typical parameters of the tine component 12 are:

linear speed of travel over the ground: 4 m.p.h.

frequency of vibrator 50: 16–27 Hz.

average amplitude of vertical vibration of shoe 36 in the ground: 8–12 mm max. working depth of shoe 36: 12 in. (30 cm.)

The working depth of the shoe 36 is determined by adjustment of the height of the tool bar 11.

The junction of the lower of the vibrator mounting lugs 48 with the line of the back fillet 32 provides a shallow "pocket" which affords a bearing for the free end of a tensioning bolt 60. This bolt is captive in the yoke 58 of a forked spring tensioner 62 the free end of each leg of which carries a peg 64 for engagement by the rear end of a respective one of a pair of tine loading springs 66, the front ends of which are engaged with an anchor pin 68 located near the pivot 26 on a reaction lever 70 which forms the main element of the reaction component 14. Since the springs 66 are tension springs, the anchor pin 68 is located above the level of the reaction lever pivot 26 so that the spring reaction to any backward force applied to the tine 35 produces a turning moment on the reaction lever 70 which tends to depress the end thereof behind the tine. The anchor pin 68 also forms an abutment for engagement by a hooked stop lug 72 fixed on the underside of the horizontal arms 28 of the tine component 12. Engagement of the pin 68 and lug 72 limits the relative angular deflection of the tine and the reaction components 12, 14 in the downward direction, and thus provides a control of the maximum depth of penetration of the soil by the tine 35 and the shoe 36 for any given height of the tool bar 11.

The depression of the reaction lever 70 under the reactive force of the springs 66 on the pin 68 is opposed by a roller 74 mounted behind, and in line with, the tine 35 on the rearward end of the lever 70. The mounting illustrated is a trailing arm 76 pivotally connected to the lever 70 about a horizontal axis at 78 and engageable, in its working position, with a web 80 on the lever 70. The roller 74 is adapted to bridge the slit formed in the turf by the tine 35, and the force tending to depress the lever 70 is transferred to the roller 74 so that the system is self-balancing. The pivotal connection at 78 allows the arm 76 and roller 74 to be swung downwards and forwards into a transport position for reducing overhang of the whole unit 10, 12, 14 when the vehicle on which it is carried is travelling to and from the site.

Ahead of the tine 35, a disc coulter 82 or equivalent turf cutting tool is carried on the lever 70 to prepare a slit in the turf for ease and cleanness of penetration of the soil by the narrow tine 35.

In operation, the subframe component 10 is secured to the conventional transport mechanism at the back of a bulk slurry tanker wagon, and normally carries a plurality of tine and reaction units 12, 14. Each hollow tine 35 is coupled by its nipple 44 and respective flexible hose to an outlet valve on the bulk tank. On reaching the site where the slurry is to be buried, the roller 74 on each reaction lever 70 is swung up from its transport position to the attitude shown in FIG. 1, and the transport mechanism lowers the tool bar 11 to its chosen height. The vibrator motor 52 is started, the tanker wagon pulls away on its appointed path, and each shoe 36 digs into the slit cut by the coulter 82 down to its designed working depth. The tank outlet valve is opened and slurry flows down each hollow tine 35 to be deposited on the floor of the tunnel or furrow machined by the shoe 36 below the surface 18 of the soil. The vibration of the shoe 36 breaks up the soil in its immediate vicinity and tends to make it more absorptive of the slurry which is deposited in the bottom of the tunnel right at its point of formation. Hence there is no risk that the injection will take place at less than the designed depth due to premature collapse of the walls of the tunnel. Furthermore, the discharge orifice 37 of the hollow tine 35 is fully shielded by the shoe or share 36 so that there is negligible risk that soil can clog it; and if any soil were to find its way under the canopy formed by the shoe, the vertical vibration of the tine 35 is a further safeguard against a build-up of soil in the discharge orifice 37.

On grassland, the tine 35 offers a low aspect ratio to the already cut turf so that there is minimum tendency for the surface layer to be broken up and thrown aside, and this low risk of major disturbance is reinforced by the forward inclination of the chamfered leading edge 34 which discourages the turf from breaking away upwards. The vertical vibration of the tine 35 and shoe or share 36 opens up the soil texture below the normal root level of the grass to improve the absorptive capacity of the ground.

Finally, the roller 74 following the tine 35 recloses the cut made thereby and seals the slurry beneath the surface, thus minimising any noxious odor of land treated by slurry injection.

The tine 35 and shoe or share 36 are held, in the embodiment illustrated, at their controlled angle and depth by the conventional adjustable tension loading spring arrangement 58 . . . 68. The location of the anchor pin 68 on the reaction lever 70, which is separately pivoted on the self-aligning bracket 22, serves to insulate the subframe unit 10 from the fluctuations in tension of the springs 66 due to irregularities of the structure of the ground, including subsurface rocks or stones, by transmitting the variations in thrust back to the ground via the roller 74. The arrangement also serves to reduce the transmission to the tool bar 11 of the oscillations set up by the vibrator 50 in the loading springs 66. Insulation of the tool bar is further improved by the use of cushion mounted pivots 24, 26.

The various parameters of the system can be varied at will according to prevailing soil conditions.

Other forms of vibrator can be substituted for the rotary eccentric weight mechanism 50 according to preference. Where, as is customary, a number of tines 35 work in parallel across the width of the tanker wagon, their vibrators 50 will not necessarily act in synchronism, although their vibration frequencies will be substantially the same. In the case of hydraulically powered drive motors 52, all motors are energized from a common supply. By separating the tine component 12 from the reaction component 14, and using the latter to transfer the reaction of the tine loading spring directly to the ground, interaction between the several tine assemblies attached to a common tool bar 11 is reduced to negligible proportions. In particular, the achievement and maintenance of precise out-of-phase vibration of the tines 35, in order to obtain a self-cancelling overall effect, is unnecessary.

When the shoe or share 36 passes through the ground, the effective level of the soil above it is necessarily raised, but there is no breakup of the surface such as is achieved by conventional cultivators on arable land. This does not mean, however, that the invention is not applicable to arable sites; such land can still be treated by subsurface injection of slurry using the method of the present invention. In fact, there may be advantage in so doing, since it becomes possible to ensure maximum absorption of slurry with minimum noxious odor prior to ploughing or cultivation.

The size and weight of each roller 74 can be selected according to the requirements of the soil on the site where the subsurface injection of slurry is to take place; but in any case it is preferable to reduce compaction of the soil, and the location of the roller some distance behind the tine reduces the reaction load applied thereby.

The application of vibration to the tine 35 and its shoe or share 36 not only serves to break up the soil in the vicinity of the tunnel formed by the shoe and to prevent blockage of the slurry outlet, but also facilitates the passage of slurry through the duct 40, and thus renders the system amenable to the disposal of materials in powder or granular form by preventing the formation of aggregations on the walls of the duct 40.

Although the drawings illustrate tensile loading springs 66, it is to be understood that compression springs, or pneumatic or hydraulic tine-loading arrangements, can be substituted, the reaction lever 70 providing the requisite abutment or anchorage in each case. The principal reason for resiliently biasing the tine 35 to its normal working position, whether by spring or pressure fluid loading, is to allow the tine to deflect rearwards and upwards about a transverse pivotal axis when a relatively immovable object is encountered in the soil, such as a subsurface rock or tree root. If, however, it is known that the site has previously been cleared of such obstructions, the tine 35 can be rigidly clamped to the tool bar 11, and the resilient loading thereof omitted.

The depending arms 30 of the bell-crank shaped plates which form the side walls of the shank portion of a tine 35 are preferably straight-edged as shown, but one or both edges can be curved if desired. Thus, the leading edge 34 of the tine can be either concave or convex fowards provided that the tangent to such curve at the point where the latter meets the surface 18 of the soil makes an acute angle therewith measured on the side towards which the tine 35 travels.

The shoe 36 can be either permanently or detachably secured to the tine 35, and alternative sizes or proportions of shoe can be provided to suit differing soil characteristics. In all alternatives, however, it is highly desirable that the surface of the shoe which engages the bottom end of the tine should be coextensive with the surface of that end, and that the back end of the shoe should not lie ahead of the back edge 32 of the tine, in order to ensure maximum protection for the slurry discharge port 37 against fouling by loose soil.

The depth of penetration of the soil by the shoe 36 can be controlled in any desired manner; but it is preferred to do this by control of the height of the tool bar 11. The latter is usually attached to the chassis of the tanker wagon by a linkage such as a parallel linkage and is controlled for height by an hydraulic ram or equivalent mechanism. The position of the tool bar at any instant can be reported to the driver by a sensor system which may also, if desired, form servo loop for automatic depth control.

The rate of application of slurry in normal conditions is of the order of 10,000 gallons per acre, and can be varied by controlling any one or more of three main parameters of the slurry injection system:

(a) speed of travel of the vehicle over the ground;
(b) rate of flow of slurry through each duct 40;
(c) number of tine units 12 carried by the tool bar 11.

We claim:

1. Apparatus for injecting slurry beneath a soil surface comprising
   a rigid frame adapted to be traversed over the soil in which the slurry is to be injected;
   a tine displaceable through said soil in a predetermined direction of travel in a vertical plane containing said direction of travel through the soil and including a substantially straight working shank portion provided with a longitudinally extending duct, said shank portion being adapted for extending into the soil;
   a pivotal mounting means for mounting the tine on the rigid frame to permit the tine to rock in the said vertical plane;
   a loading spring for biasing the tine to a working attitude in which the straight working shank portion inclines to the surface of the soil at an acute angle;
   a generally upwardly convex arched shoe increasing in height and width from front to rear relative to said direction of travel and secured to the tine and including a top provided with an aperture registering with the duct in the shank portion of the tine;
   means for feeding slurry into the duct;
   a vibrator means on the shank portion of the tine for inducing vertical vibrations therein; and
   a reaction lever pivoted on the rigid frame and extending rearwards relative to said direction of travel to a point behind the tine and including an anchorage for the loading spring so located as to urge the rear end of the reaction lever downwardly against the soil under the reaction force of the loading spring.

2. Apparatus according to claim 1 wherein the reaction lever carries a roller for transmitting the reaction force on the lever to the surface of the soil.

3. Apparatus according to claim 2 wherein the reaction lever further comprises an arm and a pivot and wherein the roller is mounted on said arm which is coupled by said pivot to the lever and which is free to swing about the said pivot between a position of alignment of the lever and the arm and a downward and forward position relative to said position of alignment in which the roller lies below the pivot.

4. Apparatus according to claim 2 wherein the tine and the reaction lever include interengageable elements which determine the maximum depth of penetration of the shoe into the soil.

5. Apparatus according to claim 4 comprising a bracket and a vertical pivot and wherein the tine and the reaction lever are pivotally mounted on said bracket, and the bracket is carried on said vertical pivot which is mounted on the rigid frame.

6. Apparatus according to claim 1 wherein the vibrator includes an eccentric weight rotatable in the vertical plane and mounted vertically above the shoe.

7. Apparatus according to claim 6 comprising a disc coulter on the reaction lever ahead of and in alignment with the tine.

* * * * *